(12) United States Patent
Hilson et al.

(10) Patent No.: US 6,858,186 B2
(45) Date of Patent: Feb. 22, 2005

(54) CHAMBERS FOR STORING ARRAYS

(75) Inventors: Richard O. Hilson, Sunnyvale, CA (US); Bill J. Peck, Mountain View, CA (US); Eric M. Leproust, Campbell, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 114 days.

(21) Appl. No.: 10/035,907

(22) Filed: Dec. 24, 2001

(65) Prior Publication Data

US 2003/0118718 A1 Jun. 26, 2003

(51) Int. Cl.[7] ................................................. B01L 9/00
(52) U.S. Cl. ..................................... 422/104; 422/300
(58) Field of Search ............................... 438/477, 909, 438/935; 422/104, 9, 10, 300; 34/90, 192, 201, 209, 231, 233, 237, 238; 117/200, 906

(56) References Cited

U.S. PATENT DOCUMENTS

| 4,992,301 A | * | 2/1991 | Shishiguchi et al. ........ 118/724 |
| 5,484,484 A | * | 1/1996 | Yamaga et al. ............. 118/719 |
| 6,248,672 B1 | * | 6/2001 | Takagi ........................ 438/758 |

* cited by examiner

Primary Examiner—Elizabeth McKane (57) ABSTRACT

Apparatus and methods are disclosed for storing a plurality of supports having a plurality of chemical compounds bound to the surfaces of the supports. In the apparatus, a mechanism for diffusively introducing pressurized gas into the apparatus is in fluid communication with an outlet element comprising a plurality of openings. A holding chamber for the supports is in fluid communication with the outlet element. The outlet element and the holding chamber are disposed such that gas flow through the chamber is substantially uniform and unidirectional. The holding chamber comprises an opening sufficient to permit movement of the supports to and from the holding chamber and comprises a plurality of holding elements for holding the supports.

39 Claims, 2 Drawing Sheets

CHAMBERS FOR STORING ARRAYS

BACKGROUND OF THE INVENTION

This invention relates to chambers for storing supports on which chemical reactions have been carried out. The invention has particular application to avoiding contamination during the storage of supports, which have a plurality of chemical compounds, such as biopolymers, bound to their surfaces.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship to, for example, disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, e.g., oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, known areas or sites of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, for diagnosing disease, identifying gene expression, monitoring drug response, determination of viral load, identifying genetic polymorphisms, analyze gene expression patterns or identify specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical probe species provide methods of highly parallel detection, and hence improved speed and efficiency, in assays. Assuming that the different sequence polynucleotides were correctly deposited in accordance with the predetermined configuration, then the observed binding will be indicative of the presence and/or concentration of one or more polynucleotide components of the sample.

The arrays may be microarrays created by in-situ synthesis of biopolymers such as polynucleotides, including oligonucleotides, and polypeptides or by deposition of molecules such as oligonucleotides, cDNA and so forth. In general, arrays are synthesized on a surface of a substrate by one of any number of synthetic techniques that are known in the art. In one approach to the synthesis of microarrays, an apparatus is employed that comprises a reaction chamber and a device for dispensing reagents to the surface of a substrate at discrete sites. A positioning system, which may be a robotic manipulator, moves the substrate to the chamber, in which at least a portion of the device for dispensing reagents is housed. Alternatively, the device for dispensing reagents may be moved in and out of the chamber. A controller controls the application of the reagents to the substrate according to predetermined procedures. The positioning system may comprise one or more stages for moving the substrate to various positions for the dispensing of reagents thereon. Positioning stages are typically comprised of x,y linear stages mated with theta rotational stages to provided the necessary degrees of freedom to undertake the required motions.

Since the arrays provide for a large number of different compounds, the process requires many steps. With oligonucleotides, an in situ synthesis is employed wherein each monomer addition involves a plurality of steps, so that the synthesis at each site involves the number of steps for each addition multiplied by the number of monomers in the oligonucleotide. In order to be able to produce arrays of oligonucleotides efficiently, automated systems are preferred to provide for the accurate placement of reagents, efficient reaction, close packing of different compounds and the indexing of individual oligonucleotides with a particular site in the array.

During the synthesis or after completion of the synthesis, the supports having the chemical compounds on their surfaces are generally stored for periods of time prior to further synthesis or prior to packaging. Storage periods range from about 1 sec to about 24 hours. During storage it is important to protect the chemical compounds on the surface of the support from contamination by airborne contaminants, e.g., dust, pollen, biological suspensions in air (such as viruses, bacteria), from destructive agents such as reactive gases, e.g., ozone, sulfur dioxide, nitrogen oxides, oxygen, dihydrogen sulfide, from reactive ions, radicals, peroxides and, from organic or mineral materials that may be deposited or adsorbed on to the surface, e.g. oils, tar.

There is a need, therefore, for storage apparatus and methods that avoid contamination of the surfaces of the supports. Storage is preferably in a chamber that is open at one end to permit supports to moved into and out of the chamber without the need to open and close doors and the like.

SUMMARY OF THE INVENTION

One embodiment of the present invention is an apparatus for storing a plurality of supports having a plurality of chemical compounds bound to the surface of the support. In the apparatus, a mechanism for diffusively introducing pressurized gas into the apparatus is in fluid communication with an outlet element comprising a plurality of openings. A holding chamber, or storage chamber, for the supports is in fluid communication with the outlet element. In some embodiments a flow straightener is employed between the outlet element and the holding chamber. The outlet element and the holding chamber are disposed such that gas flow through the chamber is substantially uniform. The holding chamber comprises an opening sufficient to permit movement of the supports to and from the holding chamber and comprises a plurality of holding elements for holding the supports.

Another embodiment of the present invention is an apparatus for storing a plurality of supports having a plurality of biopolymers bound to individual sites on the support. The apparatus comprises a manifold comprising one or more compartments. Each of the compartments is in fluid communication with at least one gas inlet for introducing pressurized gas into the apparatus. The gas inlets are positioned in the manifold such that gas is introduced into the manifold in a direction that is substantially normal to the direction of gas exiting the manifold. An outlet element is in fluid communication with the manifold and the outlet element comprises a plurality of openings through the outlet element. A holding chamber for the supports is in fluid communication with the outlet element. The outlet element and the holding chamber are disposed such that gas flow therethrough is substantially unidirectional. In some embodiments a flow straightener is employed between the outlet element and the holding chamber. The holding chamber comprises an opening sufficient to permit movement of the supports to and from the holding chamber and comprises a plurality of holding elements for holding the supports.

Another embodiment of the present invention is an apparatus for storing a plurality of supports having an array of polynucleotides on the surface of the support. The apparatus comprises a manifold having two compartments, each of which is in fluid communication with at least two gas inlets. A perforated element is in fluid communication with the manifold and comprises about 5 to about 200 perforations per square inch. A holding chamber for the supports is in fluid communication with the outlet element. In some embodiments a flow straightener such as a honeycomb element is employed between the outlet element and the holding chamber. The outlet element and the holding chamber are disposed such that gas flow through the chamber is substantially unidirectional. The holding chamber comprises an opening sufficient to permit movement of the supports to and from the holding chamber and comprises a plurality of holding elements for holding the supports. The holding elements are adapted to hold the supports in a substantially vertical position. The apparatus also comprises a mechanism for moving the supports into and out of the holding chamber through the opening and for positioning the supports in the holding elements.

Another embodiment of the present invention is a method for storing a plurality of supports having a plurality of biopolymers bound to the surface of the supports at individual sites. In the method, an inert gas is introduced into a holding chamber. The gas has a positive and substantially unidirectional flow through and out of the chamber. The supports are placed into the chamber so that the plane of the supports is substantially parallel to the direction of the unidirectional flow of gas.

Another embodiment of the present invention is a method for synthesizing a plurality of biopolymers on a support. The support and a dispensing system for dispensing reagents for the synthesis of the biopolymers are brought into a dispensing position relative to the activated discrete sites on the surface. The reagents are dispensed to the discrete sites and the support and/or the dispensing system are removed from the relative dispensing position. The above steps are optionally repeated until the biopolymer is formed. During the synthesis the support is stored in a holding chamber having an inert gas flowing therethrough in a positive and substantially unidirectional flow. The support is oriented in the holding chamber so that the plane of the support is substantially parallel to the direction of the unidirectional flow of gas.

BRIEF DESCRIPTION OF THE DRAWINGS

FIG. 1 is a schematic diagram in partial cut-away depicting one embodiment of an apparatus in accordance with the present invention.

FIG. 2 is a cross-sectional view of the apparatus of FIG. 1 taken along lines 2—2.

FIG. 3 is a schematic diagram depicting an embodiment of an apparatus for synthesizing chemical compounds on the surface of a support where the apparatus comprises an apparatus in accordance with the present invention.

DETAILED DESCRIPTION OF THE INVENTION

In its broadest aspect the present invention provides a storage chamber in which the internal environmental conditions within the storage chamber are controlled to prevent contamination of the surfaces of the supports and destruction of chemical compounds on the surfaces of the supports. In the present apparatus, a gas such as an inert, usually dry, gas is introduced under pressure into the reaction chamber in such a manner as to provide careful distribution and controlled uniform flow of the gas through and out of the storage chamber. Facile exiting of the gas is provided so that airborne contaminants and destructive gases in the atmosphere outside of the storage chamber are prevented from entering the storage chamber. In the present invention pressurized gas is distributed into a spatially uniform pressure field that ultimately results in a spatially homogeneous, unidirectional flow field. Flow control is also provided so that the flow field in the reaction chamber can be tuned to overcome resistance due to the presence of supports in the storage chamber.

In one embodiment an apparatus in accordance with the present invention comprises a mechanism for introducing gas into the apparatus, an outlet element in fluid communication with the above mechanism and a storage chamber through which the gas flows. The outlet element comprises a plurality of openings through the outlet element. The outlet element may be designed to provide flow-straightening of the gas in the flow field or a flow-straightening element may be employed in fluid communication with the outlet element to achieve this result.

The mechanism for introducing gas into the apparatus is one that permits gas under high pressure to be distributed from a relatively narrow source into a spatially uniform pressure field that results in a spatially homogeneous flow field. The gas is usually under a pressure of about 60 to about 80 pounds per square inch (psi) before entering a volume flow meter, which is adapted to provide for the gas pressure within the storage chamber to approximate atmospheric pressure. The inlet for the gas is typically an opening in a wall of a compartment of a manifold. The opening may be any shape such as circular, oval, rectangular, square, and the like with a cross-sectional dimension of about $1/16$ inch to about 2 inches, usually, about $1/16$ inch to about $1/2$ inch. The openings are connected to suitable tubing for conducting the gas to the opening. Such tubing has an inside diameter of about 0.06 to about 0.3 inches, usually about 0.125 to about 0.25 inches, typically, about 0.19 inches. The tubing is connected to a supply of gas.

It is important that the gas be inert to the components and conditions within the storage chamber. The gas should be inert under the conditions of use in the present invention. Such gases include nitrogen, noble gases, and the like, and mixtures thereof. Noble gases include, for example, helium, argon, krypton, xenon, neon, and the like. Preferably, the gas should have a water content that is less that about 1 part per million (ppm) by volume, usually, less than about 0.1 ppm by volume. The nature and composition of the gas is determined by the particular storage conditions desired and the condition of the atmosphere outside the storage chamber.

Various mechanisms for diffusively introducing gas into the apparatus may be employed. In one approach the mechanism comprises one or more gas inlets and a manifold comprising one or more compartments. Each of the compartments is in fluid communication with at least one respective gas inlet. In general, the number of compartments is based on the level of pressure of the gas, and the size of the coupling chamber, and so forth. Usually, the number of compartments in the manifold is about 2 to about 4, usually about 2, and can be scaled based on the dimensions of the apparatus. The main function of the compartments of the manifold is to slow the flow of incoming gas and to convert the kinetic energy (dynamic pressure) of the gas to a higher static pressure with a flow at a lower velocity distributed more uniformly over the outlet of the manifold. Typically, the flow of incoming gas is slowed by a factor of about 10 to 100.

In one approach gas is introduced into the compartments in a direction that is substantially normal to the direction in which the gas flows through the outlet element and enters the storage chamber or holding chamber. By "substantially normal" is meant that the angle formed by the axis of the gas entering the compartments of the manifold and the axis of the gas exiting the compartments into the outlet elements is about 90 degrees. In one approach the gas inlet sources are in the side walls of the manifold. Gas introduced through the side walls of the compartments enters the compartments in such a manner that the gas flow from each side is in opposition to slow the gas before it enters the outlet element on its way to the storage chamber. This enhances energy dissipation of the gas within the compartments of the manifold.

The dimensions of the compartments are about 5 to about 10 inches, usually, about 6 to about 8 inches, and in one embodiment about 7 inches, by about 2 to about 4 inches, usually, about 2.5 to about 3 inches, and in one embodiment about 2.75 inches, by about 1 to about 2 inches, usually about 1.2 to about 1.5 inches, and in one embodiment about 1.3 inches. Of course, the dimensions of the compartments may vary depending on the size of the chamber and the like. The manifold components are usually fabricated from materials such as, for example, metal, Plexiglas and the like.

Usually, gas is supplied to the tubing that connects to the openings in the manifold from a gas source connected by an appropriate valve, which provides a level of flow control in the above system. Suitable valves may be, for example, metering valves such as, e.g., Swagelock needle valves and the like. Other valves that may be employed include any valve with an easily adjustable flow rate at moderate pressures and so forth. With the use of valves, the flow rate to each compartment may be controlled. Accordingly, the flow field in the storage chamber can be tuned to resistance from the supports in the storage chamber. With a suitable valving system, the pressure of the gas can be increased to account for the interference from the supports. The valving system may be controlled by a suitable controller to adjust the pressure of the gas as needed. Such controllers include, for example, proportional vales, and so forth. The controller acts in response to an appropriate sensor that senses the level of pressure flow within the chamber, the ambient environment in the interior of the chamber, and so forth. Suitable sensors include, for example, low pressure manometers, pressure transducers, and the like.

The flow rate of gas through the storage chamber of the present apparatus is about 0.2 liters to about 3 liters per minute, usually, about 0.8 liters to about 2 liters per minute, more usually, about 1 liter per minute. A flow visualization system may be employed to monitor the flow of gas within the apparatus and ensure that the gas maintains a desired uniform flow through and out of the storage chamber. Suitable flow visualization systems include, for example, helium or hydrogen bubble generators or smoke wire visualization during development, and the like.

As mentioned above, an outlet element is in fluid communication with the compartments of the manifold. The outlet element comprises a plurality of openings therein. The pressure differential behind the outlet element forces a series of small jets out of the plurality of openings. This results in further homogenization of the flow field of gas because the pressure drop across the outlet element depends on the driving pressure in the manifold. The greater the driving pressure, the greater is the pressure drop. The pressure of the gas as it enters the outlet element is usually about ambient atmospheric pressure. The pressure drop across the outlet element is usually much less than 1 psi.

The outlet element usually comprises about 5 to about 200 openings per square inch, more usually, about 10 to about 50 openings per square inch. The openings may be considered to be perforations in the outlet element (for relatively thin outlet elements) or bores through the outlet element (for relatively thick outlet elements). The dimensions of the outlet element are sufficient to provide much or all of a single wall of the storage chamber. The thickness of the outlet element is primarily dependent on whether the outlet element functions also as a flow straightener. When the outlet element functions as a flow straightener, the outlet element is relatively thick, namely, about 0.25 to about 2 inches thick, usually, about 1 to about 1.5 inches thick, more usually, about 0.8 to about 1.2 inches thick. When the outlet element is employed in conjunction with a flow-straightening element, the outlet element is relatively thin, namely, about 0.02 to about 0.2 inches thick, usually, about 0.04 to about 0.125 inches thick, more usually, about 0.05 to about 0.07 inches thick. In general, the dimensions of the openings are dependent on the available prefabricated materials having the desired number of openings. In general, the dimensions of the openings are dependent on the balance between the diffusion quality needed and the change in pressure available. The dimensions of the openings are about 0.03 to about 0.25 inches in diameter, usually about 0.05 to about 0.125 inches in diameter.

The outlet element is fabricated from a material that does not absorb water to any significant extent or outgas any potential contaminants such as plasticizers or chemicals in adhesives, Suitable materials for the outlet element include, by way of example and not limitation, stainless steel, e.g., electropolished stainless steel, a material coated with a hydrophobic surface, nickel plated aluminum, and so forth. The outlet element may be fabricated by techniques such as, for example, creating the features with conventional or electrical discharge machining, forming, punching, assembling or agglomerating small pieces by sintering, welding or brazing, using CNC machine tools, and the like, all of which are well known in the art.

As mentioned above, in one embodiment a flow-straightening element may be employed in fluid communication with the outlet element. Usually, the flow straightening element lies between the outlet element and the storage chamber of the present apparatus. The flow-straightening element provides for straightening of the direction of the flow and ameliorates any large-scale aspects surviving in the flow. Such large-scale aspects include large vortices generated by incoming flow in the rectangular manifolds, and the like. The flow-straightening element comprises a plurality of cavities within the structure of the element. The percentage of open area within the flow-straightening element due to the presence of cavities is about 65 to about 95%, usually, about 90 to about 95%. In one approach the flow-straightening element is a honeycomb element comprising a plurality of honeycomb features. Typically, the number of such cavities or features is sufficient to achieve the percentage of open area indicated above. Usually, the ratio of the length of the honeycomb element to the honeycomb features is at least about 7 to 1. The flow-straightening element is generally fabricated from a material such as that set forth above for the outlet element.

The flow-straightening element and the outlet element may, but need not, be separated by a space. The thickness of the space, when a space is employed, is dependent on a number of factors such as, for example, the hole size in the outlet element, the size of the flow straightener cell, flowrate and so forth. Usually, the space is about 1 to about 50 mm thick, more usually, about 2 to about 10 mm thick. The flow-straightening element and the outlet element may be mounted between the manifold and the storage chamber in a number of ways to achieve the appropriate space therebetween. Suitable mounting means include brackets, indentations in the wall of the chamber, clamping between chamber components, and so forth.

As mentioned above, the inert gas flows through the storage chamber in a substantially uniform flow and exits through an exit opening in the storage chamber. Usually, the exit opening is in a wall of the chamber opposite the outlet element. The dimensions of the opening are governed by the dimensions of the supports that are placed in the storage chamber. The dimensions of the opening should be sufficient to permit ingress and egress of the supports. In general, the opening comprises one entire end of the storage chamber. The opening preferably does not have a covering such as a door or the like.

The cross-section of the storage chamber is typically rectangular although other shapes may be employed depending on the nature of the supports to be stored in the storage chamber. For storing supports having a plurality of biopolymer features thereon, the chamber cross-section is usually rectangular. The size of the chamber is dependent on the size of the supports that are to be placed in the interior of the chamber during storage. In general, for synthesis of biopolymers on the surface of a support, the dimensions of the chamber should be sufficiently large enough so that the chamber can accommodate the support. The above factors govern the dimensions of the chamber for this purpose.

Typically, an apparatus for synthesis of biopolymer features has vertical symmetry to avoid any three-dimensional and/or re-circulating flow and to maintain a substantially steady and uniform flow. Maintaining a steady, uniform unidirectional flow of gas through the chamber ensures that the boundary layer, i.e., the region of vortical flow near the surface where viscous effects are important, along the chamber walls remains attached to the surface of the wall as long as possible. By the term "substantially uniform flow" is meant that the flow is substantially unidirectional and the flow characteristics do not vary to a significant degree across the span of the box so that the centerline velocity does not vary by more than about 10%, usually not greater than about 5%. The size of any three-dimensional scales should not be so great as they may cause convection from the ambient atmosphere to the substrates. It should be noted that laminar, turbulent or fully developed flow (referring to the boundary layer conditions) may be used to establish an overall flow regime in the chamber. One consideration is that the flow may not be totally predictable in detail due to factors such as the interaction of the seal flow entering the chamber and interference from devices inside the chamber. Furthermore, the streamlines of the clean flow issuing from the flow straightener or diffuser may not be very straight at the exit. The flow could be moving at a velocity, even recirculating with small enough amplitude, low enough frequency and/or energy, with respect to the size of and conditions at the exit so as not to entrain atmospheric air. The chamber works because the overall flow regime acts to usher flow predictably (at the "macro" level) out the exit, i.e., with minimal or no backflow or recirculation of atmospheric air into the chamber.

The walls of the chamber may be fabricated from materials such as, for example, plastics, glass, silicon dioxide, metals, lightweight composites, and so forth. It is within the purview of the invention that the walls are not fabricated from the same material. For some uses such as, for example, storage chambers for storing supports comprising biopolymers, the material for fabrication of at least one wall is transparent such as, e.g., glass, transparent plastics, silicon dioxide, quartz, and the like.

In one embodiment, angles in the interior of the chamber may be beveled. The material used to create the bevel can then be used as a seal. The angles of particular concern are those at the edges and joints of the interior of the storage chamber. In general, the angles are beveled to the extent necessary to substantially reduce or eliminate circulatory flow induced by stream-wise, resident vortices created in sharp corners, which results in stagnation of gas at or near these joints. Ideally, the angles are beveled at about 45 degrees or radiused although other angles may be employed.

The perimeter walls of the apparatus are usually constructed from a suitable material that gives structural strength to the apparatus so that supports may be moved into and out of the apparatus. In addition, the structural strength must be sufficient to accommodate the gas pressures employed. Such materials include, for example, metal, plastic, glass, quartz, lightweight composites, and the like.

The apparatus also comprises a plurality of holding elements within the storage chamber for holding the supports during storage. The holding elements may take the form of opposing plates that are mounted in the storage chamber, usually, in the top and bottom of the storage chamber. The plates comprise opposing slots for holding the supports usually in a vertical orientation although other orientations may be employed. The sizes of the slots and of the opening in the storage chamber are dependent on the size of the supports to be stored. The support may take any of a variety of configurations ranging from simple to complex. Thus, the support could have generally planar form, as for example, a slide or plate configuration, such as a rectangular or square or disc shape. The configuration of the support may be selected according to manufacturing, handling, and use considerations. In many embodiments, the support will be shaped generally as a rectangular solid, having a length in the range about 4 mm to 300 mm, usually about 4 mm to 150 mm, more usually about 4 mm to 125 mm; a width in the range about 4 mm to 300 mm, usually about 4 mm to 120 mm and more usually about 4 mm to 80 mm; and a thickness in the range about 0.01 mm to 10.0 mm, usually, from about 0.1 mm to 2 mm and, more usually, from about 0.2 to 2 mm. Accordingly, the sizes for the holding element in the present apparatus should be at least 10% greater than, usually, at least 5% greater than, the corresponding dimensions of the support.

The plates that form part of the holding elements are affixed in the storage chamber in such a manner as not to significantly obstruct the flow of gas that exits the outlet element and the flow straightener, if a flow straightener is used, and flows into and through the storage chamber. Accordingly, the plates of the holding elements may be affixed to one or more interior walls of the storage chamber. Usually, the plates are affixed to the bottom interior wall of the storage chamber. The manner of affixing the plates is not critical to the present invention. Any standard means for securing the plates may be employed such as, for example, fasteners such as screws and the like, spot welds, adhesives, and so forth. The holding elements may comprise end portions that are adjacent the outlet element or the flow straightener, if one is used.

In one approach brackets are employed to which the plates comprising the holding elements are secured. Accordingly, the top plate may be attached to a top portion of the bracket and not to the interior of the top wall of the storage chamber. The holding elements should hold the wafers in a manner where the wafer is substantially aligned with the direction of the flow, usually substantially vertically aligned. Such an alignment assists in facilitating the insertion and removal of the supports in the storage chamber. The supports are usually slid into and out of opposing holding elements of the storage chamber. Accordingly, proper alignment of the holding elements is important to avoid binding during sliding and so forth. The brackets should be designed to minimize obstruction to gas flow exiting the outlet element, and the flow straightener if one is used. The brackets may be in the form of a hollow rectangle or frame where the width and depth of the frame members are sufficient to provide support for the plates particularly the top plate of the holding elements. Usually, the dimensions of the slots of the frame members are about 2 mm to about 3 mm by about 2 mm to about 3 mm. Other configurations for the holding elements of the present apparatus include, for example, having the wafers aligned horizontally.

The supports may be manually or mechanically moved to the holding elements of the present apparatus. A support may be mechanically delivered from, for example, a reaction chamber, to the storage chamber to hold for a next step in the synthesis of the chemical compounds on the surface of the support. Mechanical delivery involves a grasping element, which usually comprises a main arm and an end portion that contacts and engages a surface of the support. In one embodiment the grasping element is in the form of a fork that is vacuum activated. Other embodiments of the grasping element include, for example, movable finger-like projections, and the like. The grasping element is usually part of a transfer robot that comprises a robotic arm that is capable or transferring the support from a particular location to the holding element of the present apparatus. The transfer robot may comprise a base, an arm that is movably mounted on the base, and an element for holding the support during transport that is attached to the arm. In use, the robotic arm is activated so that the support is grasped by the above-mentioned element. The arm of the robot is moved so that the support is delivered to the storage chamber through the open end that provides access to the holding elements of the storage chamber. Where the holding element comprises a vertically stacked plurality of slots, the arm moves each support into an appropriate empty slot.

As mentioned above, the supports should be presented to the present apparatus in proper orientation. Accordingly, the transfer mechanism provides a means to ensure the proper orientation of the supports delivered to the holding elements of the present apparatus. To this end the transfer mechanism is capable of rotation controlled by a suitable controller as is known in the art. Such a controller usually controls the entire motion of the transfer element as it grasps a support from one location and transports it to another location. This may involve removal of the support from a chamber at one location and insertion of the support into the storage chamber of the present apparatus at another location.

The transfer mechanism for moving the supports may be part of the present apparatus or part of another apparatus. In one embodiment a transfer robot is mounted on a main platform on which the present apparatus is mounted, either separately or with other apparatus that are involved in the synthesis of chemical compounds on the surface of the supports, e.g., reaction chambers, flow cells or chambers, and so forth.

Figure 1:
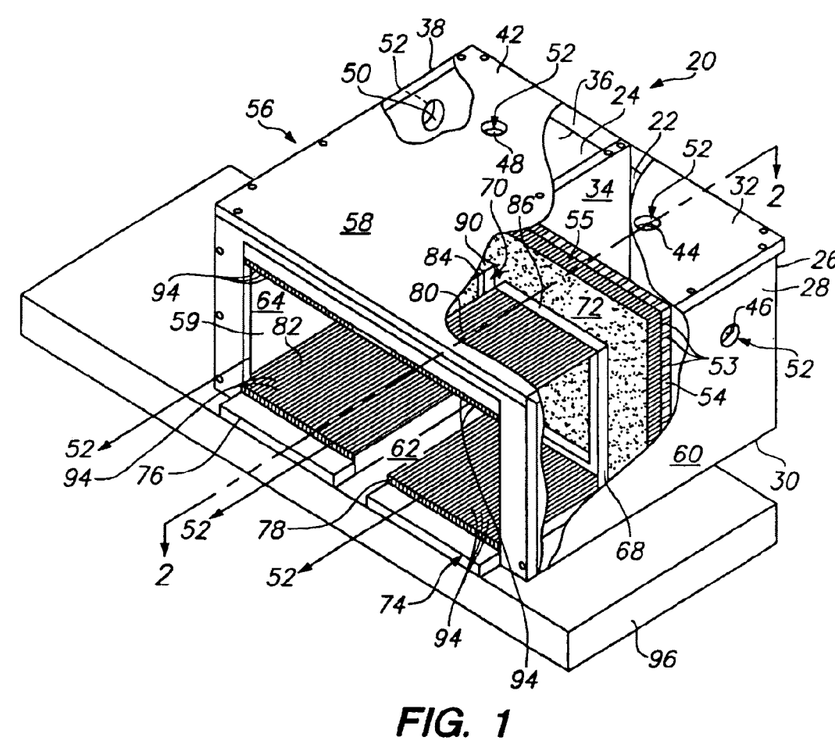
Figure 2:
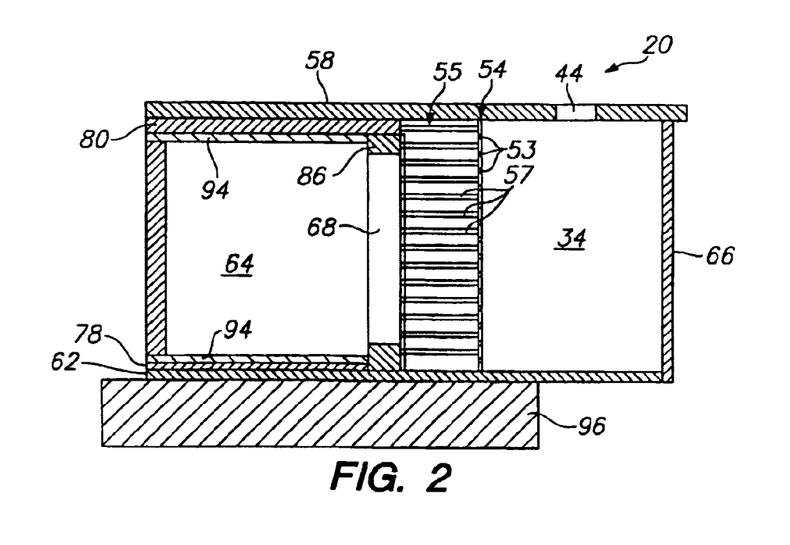

An example of an apparatus in accordance with the present invention is schematically represented in FIGS. 1 and 2. Apparatus 20 is depicted and comprises two compartments 22 and 24, which form a manifold. Compartment 22 comprises back wall 26, side wall 28, side wall 30, side wall 32 and wall 34, which is a common wall with compartment 24. Compartment 24 also comprises back wall 36, side wall 38, side wall 40 and side wall 42. Compartment 22 has two inlets 44 and 46 and compartment 24 has two inlets 48 and 50. Each inlet is adapted to be linked by suitable tubing and valves (not shown) to a source of gas 52. Outlet element 54 lies opposite back walls 26 and 36 and comprises holes 53 that extend through outlet element 54. As explained above, pressure distribution behind outlet element 54 forces a series of small jets out of holes 53, which results in a homogenization of flow of gas exiting outlet element 54. Immediately adjacent outlet element 54 is flow straightener 55, which provides for further straightening of flow as gas 52 enters storage chamber 59. Ideally, the direction of flow of gas exiting flow straightener 55 is substantially perpendicular to the horizontal axis of flow straightener 55 throughout storage chamber 59. By the term "substantially perpendicular" is meant that the relationship may vary from the perpendicular by no greater than 5%, usually, no greater than 2%.

As can be seen, the walls of the compartments are part of the overall walls of housing 56 of apparatus 20. Housing 56 comprises side walls 58, 60, 62 and 64 as well as back wall 66. Brackets 68 and 70 are mounted on front wall 72 of flow straightener 55. Holding elements 74 and 76 comprise plates 78, 80 and 82, 84, respectively. Plate 78 is affixed to the interior of wall 62 of housing 56 and plate 80 is mounted on top portion 86 of bracket 68. Plate 82 is affixed to the interior of wall 62 of housing 56 and plate 84 is mounted on top portion 90 of bracket 70. Each of the plates has a plurality of slots 94 for receiving supports for storage. It is desirable that opposing slots 94 in the plates 78 and 80, and 82 and 84, respectively, are oriented so that supports that are placed in the slots are substantially vertical, and ideally completely vertical, in storage chamber 59. Mounting of plate 80 on top portion 86 of bracket 68 and of plate 84 on top portion 90 of bracket 70 facilitates having slots 94 in a precisely opposing vertical relationship. In the embodiment of FIGS. 1 and 2, plates 80 and 84 are not affixed to wall 58 of housing 56 although plates 80 and 84 do fit snugly against the interior of wall 58.

In operation of apparatus 20, gas 52 is introduced into compartments 22 and 24 by means of inlets 44 and 46, and 48 and 50, respectively. Gas 52 entering as described above collides and the velocity of gas 52 entering compartments 22 and 24, respectively, is reduced. Outlet element 54 lies opposite back walls 26 and 36 so that gas that enters compartments 22 and 24 may exit through holes 53 that extend through outlet element 54. Gas 52 flows through outlet element 54 and through flow straightener 55 into storage chamber 59. Outlet element 54 restricts gas 52 to the pressure inside storage chamber 59 to be equal throughout. Gas flow through openings 53 results in flow homogenization as the gas enters flow straightener 55, which, as explained above, comprises a plurality of cavities 57 through which the gas flows into storage chamber 59. Gas exiting flow straightener 55 then flows through storage chamber 59 in a direction that is substantially perpendicular to wall 66 of housing 56. Gas exits through the front of housing 56, which is open to the outside atmosphere. Gas 52 flows through storage chamber 59 and, in doing so, flows over and around supports that are being stored in storage chamber 59. The result is that the supports are blanketed with inert gas 52. The continuous, unidirectional flow exiting storage chamber 59 ensures that no ambient gas can be convected or diffused into storage chamber 59 from outside storage chamber 59. Housing 56 of apparatus 20 may be mounted on a platform 96, which may support only apparatus 20 or which may also support other apparatus such as reaction chambers, flow chambers and so forth.

The present devices and methods may be employed in the synthesis of a plurality of chemical compounds on supports. Usually, the chemical compounds are those that are synthesized in a series of steps such as, for example, the addition of building blocks, which are chemical components of the chemical compound. Examples of such building blocks are those found in the synthesis of polymers. The invention has particular application to the in situ synthesis of biopolymers such as polynucleotides, for example, oligonucleotides. Such methods usually require a step of dispensing reagents to discrete sites on the surface of a support. The present apparatus are well suited for performing such steps, which usually require a controlled environment such as a low humidity environment.

As mentioned above, the chemical compounds are those that are synthesized in a series of steps, which usually involve linking together building blocks that form the chemical compound. The invention has particular application to the synthesis of oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure or a mixture thereof. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The support or substrate to which a plurality of chemical compounds is attached is usually a porous or non-porous water insoluble material. As indicated above, the support can have any one of a number of shapes, such as strip, plate, disk, rod, particle such as a bead, and the like. The support can be hydrophilic or capable of being rendered hydrophilic or it may be hydrophobic. The support is usually glass such as flat glass whose surface has been chemically activated for binding thereto or synthesis thereon, glass available as Bioglass and the like. However, the support may be made from materials such as inorganic powders, e.g., silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly(4-methylbutene), polystyrene, polymethacrylate, poly (ethylene terephthalate), nylon, both modified and unmodified, poly(vinyl butyrate), etc.; either used by themselves or in conjunction with other materials; ceramics, metals, and the like. Preferably, for packaged arrays the support is a non-porous material such as glass, plastic, metal or the like. In certain embodiments, such as for example where production of binding pair arrays for use in research and related applications is desired, the materials from which the support may be fabricated should ideally exhibit a low level of non-specific binding during hybridization events. In many situations, it will also be preferable to employ a material that is transparent to visible and/or UV light.

The surface of the support onto which polynucleotide compositions or other moieties are deposited or synthesized may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated), The surface of a support is normally treated to create a primed or functionalized surface, that is, a surface that is able to support the synthetic steps involved in the production of the chemical compound. Functionalization relates to modification of the surface of a support to provide a plurality of functional groups on the support surface. By the term "functionalized surface" is meant a support surface that has been modified so that a plurality of functional groups are present thereon usually at discrete sites on the surface. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid support having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The devices and methods of the present invention are particularly useful in the synthesis of arrays of biopolymers. A biopolymer is a polymer of one or more types of repeating units relating to biology. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

An array includes any one, two- or three-dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

The present devices and methods may be used in the synthesis of polypeptides. The synthesis of polypeptides involves the sequential addition of amino acids to a growing peptide chain. This approach comprises attaching a first amino acid to the functionalized surface of the support. In one approach the synthesis involves sequential addition of carboxyl-protected amino acids to a growing peptide chain with each additional amino acid in the sequence similarly protected and coupled to the terminal amino acid of the oligopeptide under conditions suitable for forming an amide linkage. Such conditions are well known to the skilled artisan. See, for example, Merrifield, B. (1986), Solid Phase Synthesis, *Science* 232, 341–347. After polypeptide synthesis is complete, acid is used to remove the remaining terminal protecting groups.

The present invention has particular application to the synthesis of arrays of chemical compounds on a surface of a support. Typically, methods and apparatus of the present invention generate or use an array assembly that may include a support carrying one or more arrays disposed along a surface of the support and separated by inter-array areas. Normally, the surface of the support opposite the surface with the arrays does not carry any arrays. The arrays can be designed for testing against any type of sample, whether a trial sample, a reference sample, a combination of the foregoing, or a known mixture of components such as polynucleotides, proteins, polysaccarides and the like (in which case the arrays may be composed of features carrying unknown sequences to be evaluated). The surface of the support may carry at least one, two, four, or at least ten, arrays. Depending upon intended use, any or all of the arrays may be the same or different from one another and each may contain multiple spots or features of chemical compounds such as, e.g., biopolymers in the form of polynucleotides or other biopolymer. A typical array may contain more than ten, more than one hundred, more than one thousand, more than ten thousand features, or even more than one hundred thousand features, in an area of less than 20 $cm^2$ or even less than 10 $cm^2$. For example, features may have widths (that is, diameter, for a round spot) in the range from a 10 $\mu$m to 1.0 cm. In other embodiments each feature may have a width in the range of 1.0 $\mu$m to 1.0 mm, usually 5.0 $\mu$m to 500 $\mu$m, and more usually 10 $\mu$m to 200 $\mu$m. Non-round features may have area ranges equivalent to that of circular features with the foregoing width (diameter) ranges.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. Some or all of the features may be of different compositions. Each array may contain multiple spots or features and each array may be separated by spaces or areas. It will also be appreciated that there need not be any space separating arrays from one another. Interarray areas and interfeature areas are usually present but are not essential. These areas do not carry any chemical compound such as polynucleotide (or other biopolymer of a type of which the features are composed). Interarray areas and interfeature areas typically will be present where arrays are formed by the conventional in situ process or by deposition of previously obtained moieties, as described above, by depositing for each feature at least one droplet of reagent such as from a pulse jet (for example, an inkjet type head) but may not be present when, for example, photolithographic array fabrication processes are used,. It will be appreciated though, that the interarray areas and interfeature areas, when present, could be of various sizes and configurations.

The devices and methods of the present invention are particularly useful in the synthesis of oligonucleotide arrays for determinations of polynucleotides. As explained briefly above, in the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used.

Biopolymer arrays can be fabricated by depositing previously obtained biopolymers (such as from synthesis or natural sources) onto a substrate, or by in situ synthesis methods. Methods of depositing obtained biopolymers include dispensing droplets to a substrate from dispensers such as pin or capillaries (such as described in U.S. Pat. No. 5,807,522) or such as pulse jets (such as a piezoelectric inkjet head, as described in PCT publications WO 95/25116 and WO 98/41531, and elsewhere). For in situ fabrication methods, multiple different reagent droplets are deposited from drop dispensers at a given target location in order to form the final feature (hence a probe of the feature is synthesized on the array substrate). The in situ fabrication methods include those described in U.S. Pat. No. 5,449,754 for synthesizing peptide arrays, and described in WO 98/41531 and the references cited therein for polynucleotide arrays.

The fluid dispensing device normally includes a reagent source or manifold as well as reagent lines that connect the source to fluid dispensing nozzles and the like. Any system may be employed that dispenses fluids such as water, aqueous media, organic solvents and the like. The fluid dispensing device may comprises a pump for moving fluid and may also comprise a valve assembly and a manifold as well as a means for delivering predetermined quantities of fluid to the surface of a support. The fluids may be dispensed by any of the known techniques such as those mentioned above. Any standard pumping technique for pumping fluids may be employed in the dispensing device. For example, pumping may be by means of a peristaltic pump, a pressurized fluid bed, a positive displacement pump, e.g., a syringe pump, and the like.

The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). A number of reagents involved in the above synthetic steps such as, for example, phosphoramidite reagents, are sensitive to moisture and anhydrous conditions and solvents are employed. Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura, et al., *Ann. Rev. Biochem.* 53: 323–356; Hunkapillar, et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to introduce the reagents for producing an array of polynucleotides on the surface of a support such as a glass support. Such methods are known in the art. One such method is discussed in U.S. Pat. No. 5,744,305 (Fodor, et al.) and involves solid phase chemistry, photolabile protecting groups and photolithography. Binary masking techniques are employed in one embodiment of the above. Arrays are fabricated in situ, adding one base pair at a time to a primer site. Photolithography is used to uncover sites, which are then exposed and reacted with one of the four base pair phosphoramidites. In photolithography the surface is first coated with a light-sensitive resist, exposed through a mask and the predetermined area is revealed by dissolving away the exposed or the unexposed resist and, subsequently, a surface layer. A separate mask is usually made for each predetermined area, which may involve one for each base pair in the length of the probe.

Another in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers and other reagents as necessary such as an activator, e.g., tetrazole, are applied to the surface of a support by means of thermal ink-jet technology. Individual droplets of reagents are applied to reactive areas on the surface using, for example, a thermal ink-jet type nozzle. The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a support. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate back side and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

Other methods for synthesizing arrays of oligonucleotides on a surface include those disclosed by Gamble, et al., WO97/44134; Gamble, et al., WO98/10858; Baldeschwieler, et al., WO95/25116; Brown, et al., U.S. Pat. No. 5,807,522; and the like.

As mentioned above, the dimensions of the support may vary depending on the nature of the support and the nature of the chemical reactions to be performed. For example, the support may be one on which is synthesized a single array of chemical compounds that are biopolymers. In this regard the support is usually about 1.5 to about 5 inches in length and about 0.5 to about 3 inches in width. The support is usually about 0.1 to about 5 mm, more usually, about 0.5 to about 2 mm, in thickness. A standard size microscope slide is usually about 3 inches in length and 1 inch in width. Alternatively, multiple arrays of chemical compounds may be synthesized on the support, which is then diced, i.e., cut, into single array supports. In this alternative approach the support is usually about 5 to about 8 inches in length and about 5 to about 8 inches in width so that the support may be diced into multiple single array supports having the aforementioned dimensions. The thickness of the support is the same as that described above. In a specific embodiment by way of illustration and not limitation, a wafer that is 6⅝ inches by 6 inches is employed and diced into one inch by 3 inch slides.

The storage chamber of the present invention may be employed in conjunction with the preparation of arrays of biopolymers on supports where temporary storage of the supports during synthesis is desired. A storage chamber apparatus such as apparatus 20 of FIGS. 1 and 2 may be used in conjunction with an apparatus for manufacturing an array of biopolymers on a support. One such apparatus is depicted in schematic form in FIG. 3 by way of illustration and not limitation. Apparatus 200 comprises platform 201 on which the components of the apparatus are mounted. Apparatus 200 comprises main computer 202, with which various components of the apparatus are in communication. Video display 203 is in communication with computer 202. Apparatus 200 further comprises print chamber 204, which is controlled by main computer 202. The nature of print chamber 204 depends on the nature of the printing technique employed to add monomers to a growing polymer chain. Such printing techniques include, by way of illustration and not limitation, inkjet printing, and so forth. Transfer robot 206 is also controlled by main computer 202 and comprises a robot arm 208 that moves a support to be printed from print chamber 204 to either first flow cell 210 or second flow cell 212. In one embodiment robot arm 208 introduces a support into print chamber 204 horizontally for printing on a surface of the support and introduces the support into a flow cell vertically. First flow cell 210 is in communication with program logic controller 214, which is controlled by main computer 202, and second flow cell 212 is in communication with program logic controller 216, which is also controlled by main computer 202. First flow cell 210 is in communication with flow sensor and level indicator 218, which is controlled by main computer 202, and second flow cell 212 is in communication with flow sensor and level indicator 220, which is also controlled by main computer 202. First flow cell 210 is in fluid communication with manifolds 222, 224 and 226, each of which is controlled by main computer 202 and each of which is in fluid communication with a source of fluid reagents, namely, 234, 236 and 238, respectively. Second flow cell 212 is in fluid communication with manifolds 228, 230 and 232, each of which is controlled by main computer 202 and each of which is in fluid communication with a source of fluid reagents, namely, 240, 242 and 244, respectively.

Figure 3:
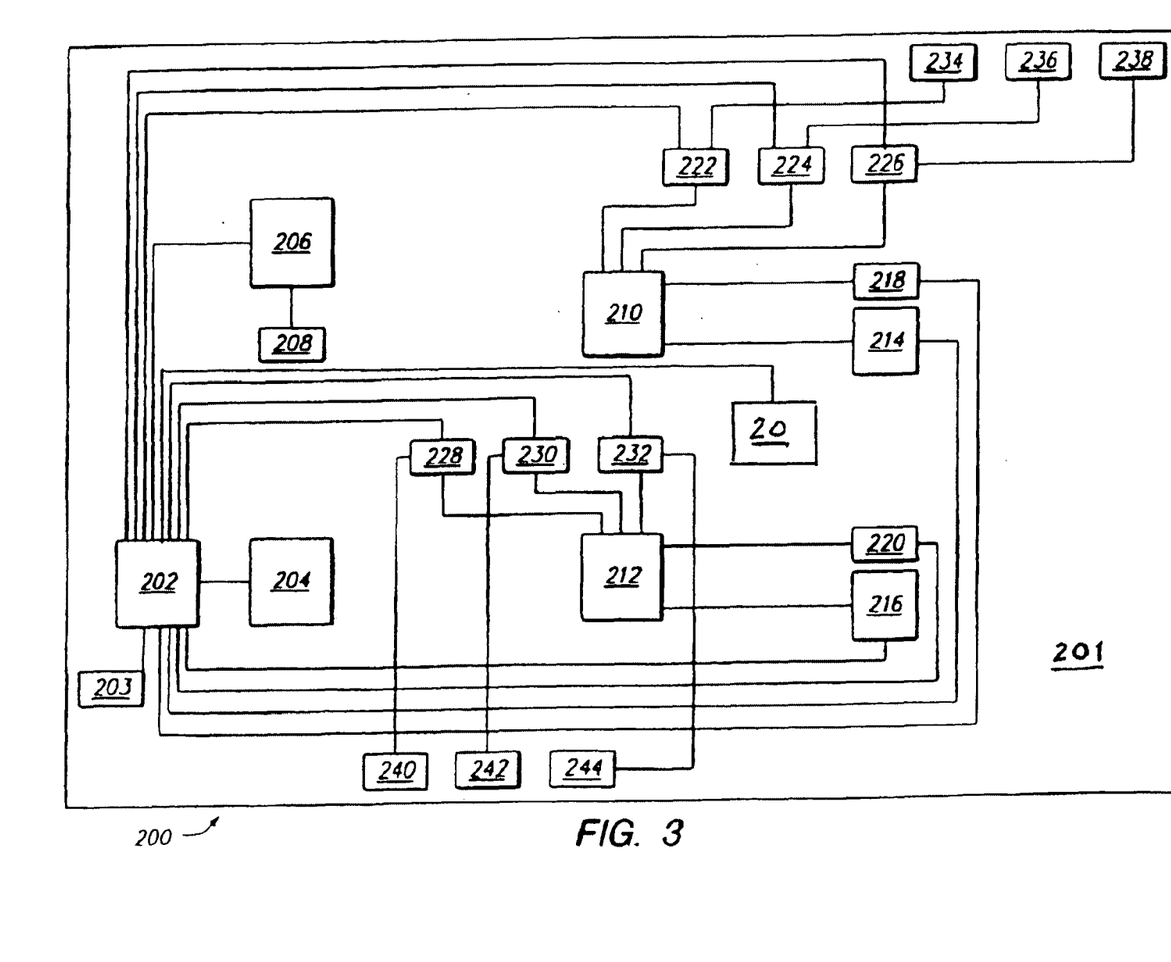

Storage chamber 20 is in electrical communication with main computer 202 to control the input of an inert gas into storage chamber 20. At desired predetermined times during the synthesis of arrays on multiple supports, main computer 202 instructs robot arm 208 to move a support to storage chamber 20 from print chamber 204 or flow cell 210 or 212 or to move a support from the latter to storage chamber 20.

During the various steps in the synthesis of the biopolymers, the supports may be stored to prevent contamination of the biopolymer precursors on the surface of the supports and to avoid exposure of the surfaces of the supports to reactive conditions such as reactive gases from the surrounding exterior atmosphere. The temperature of the interior of the storage chamber may be controlled by controlling the temperature of the gas that is introduced into apparatus 20.

The amount of the reagents employed in each synthetic step in the method of the present invention is dependent on the nature of the reagents, solubility of the reagents, reactivity of the reagents, availability of the reagents, purity of the reagents, and so forth. Such amounts should be readily apparent to those skilled in the art in view of the disclosure herein. Usually, stoichiometric amounts are employed, but excess of one reagent over the other may be used where circumstances dictate. Typically, the amounts of the reagents are those necessary to achieve the overall synthesis of the chemical compound in accordance with the present invention. The time period for conducting the present method is dependent upon the specific reaction and reagents being utilized and the chemical compound being synthesized.

The apparatus of the invention further comprise appropriate electrical and mechanical architecture and electrical connections, wiring and devices such as timers, clocks, and so forth for operating the various elements of the apparatus. Such architecture is familiar to those skilled in the art and will not be discussed in more detail herein.

As mentioned above, the apparatus functions and the methods in accordance with the present invention may be carried out under computer control, that is, with the aid of a computer. For example, an IBM® compatible personal computer (PC) may be utilized. The computer is driven by software specific to the methods described herein. A preferred computer hardware capable of assisting in the operation of the methods in accordance with the present invention involves a system with at least the following specifications: Pentium® processor or better with a clock speed of at least 100 MHz, at least 32 megabytes of random access memory (RAM) and at least 80 megabytes of virtual memory, running under either the Windows 95 or Windows NT 4.0 operating system (or successor thereof).

Software that may be used to carry out the methods may be, for example, Microsoft Excel or Microsoft Access, suitably extended via user-written functions and templates, and linked when necessary to stand-alone programs that perform other functions. Examples of software or computer programs used in assisting in conducting the present methods may be written, preferably, in C/C++, PERL, Visual BASIC and so forth. It should be understood that the above computer information and the software used herein are by way of example and not limitation. The present methods may be adapted to other computers and software. Other languages that may be used include, for example, PASCAL, or assembly language.

A computer program may be utilized to carry out the above method steps. The computer program provides for (i) introducing pressured gas into the storage chamber of the present invention, (ii) moving a support into the present storage chamber, (iii) moving the support from the storage chamber to a reaction chamber, (iv) dispensing monomeric reagents to predetermined sites on the surface of the support, (v) moving the support into the present storage chamber, (vi) moving the support to, for example, a flow cell, for applying reagents other than the monomeric reagents to the surface of the support, and (vii) optionally, repeating the above steps until the array of biopolymers is formed. Another aspect of the present invention is a computer program product comprising a computer readable storage medium having a computer program stored thereon which, when loaded into a computer, performs the aforementioned method.

The above supports may be employed in various assays involving biopolymers. For example, following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the AGILENT MICROARRAY SCANNER available from Agilent Technologies Inc, Palo Alto, Calif. Other suitable apparatus and methods are described in U.S. patent applications: Ser. No. 09/846,125 "Reading Multi-Featured Arrays" by Dorsel, et al.; and Ser. No. 09/430,214 "Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere).

Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. An apparatus for storing a plurality of supports having a plurality of chemical compounds bound thereto at individual sites thereon, said apparatus comprising:
   (a) a mechanism for diffusively introducing pressurized gas into said apparatus,
   (b) an outlet element in fluid communication with said mechanism, said outlet element comprising a plurality of openings therein,
   (c) a holding chamber for said supports in fluid communication with said outlet element, said outlet element and said holding chamber and said supports being disposed such that gas flow through and out of said holding chamber is substantially unidirectional and substantially parallel to said supports, said holding chamber comprising an opening sufficient to permit movement of said supports to and from said holding chamber and comprising a plurality of holding elements for holding said supports, and
   (d) a flow-straightening element disposed in fluid communication between said outlet element and said holding chamber.

2. An apparatus according to claim 1 wherein said mechanism comprises one or more gas inlets and a manifold comprising one or more compartments, each of said compartments being in fluid communication with one or more gas inlets.

3. An apparatus according to claim 2 wherein said gas inlets are substantially perpendicular to the axis of said openings in said outlet element.

4. An apparatus for storing a plurality of supports having a plurality of chemical compounds bound thereto at individual sites thereon, said apparatus comprising:
   (a) a mechanism for diffusively introducing pressurized gas into said apparatus,
   (b) an outlet element in fluid communication with said mechanism, said outlet element comprising a plurality of openings therein, and
   (c) a holding chamber for said supports in fluid communication with said outlet element, said outlet element and said holding chamber and said supports being disposed such that as flow through and out of said holding chamber is substantially unidirectional and substantially parallel to said supports, said holding chamber comprising an opening sufficient to permit movement of said supports to and from said holding chamber and comprising a plurality of holding elements for holding said supports, wherein said holding elements for said supports are adapted to hold said supports in a substantially vertical position.

5. An apparatus for storing a plurality of supports having a plurality of biopolymers bound thereto at individual sites thereon, said apparatus comprising:
   (a) a manifold comprising one or more compartments, each of said compartments being in fluid communication with at least one gas inlet for introducing pressurized gas into said apparatus, wherein said gas inlets are positioned in said manifold such that gas is introduced into said manifold in a direction that is substantially normal to the direction of gas exiting said manifold,
   (b) an outlet element in fluid communication with said manifold, said outlet element comprising about 10 to about 50 openings per square inch, and
   (c) a holding chamber for said supports in fluid communication with said outlet element, said outlet element and said holding chamber and said supports being disposed such that gas flow through and out of said holding chamber is substantially unidirectional and substantially parallel to said supports, said holding chamber comprising an opening sufficient to permit movement of said supports to and from said holding chamber and comprising a plurality of holding elements for holding said supports.

6. An apparatus according to claim 5 wherein each of said gas inlets comprises a valve.

7. An apparatus according to claim 5 wherein said manifold is adapted for introduction of gas at a pressure of about 60 to about 80 psi.

8. An apparatus according to claim 5 wherein said outlet element is about 0.2 to about 2 inches thick.

9. An apparatus according to claim 5 wherein the diameter of each of said openings is about 0.03 to about 0.25 inches.

10. An apparatus according to claim 5 wherein said outlet element is about 0.02 to about 0.2 inches thick and said apparatus comprises a flow-straightening element disposed in fluid communication between said outlet element and said chamber.

11. An apparatus according to claim 10 wherein said flow-straightening element is a honeycomb element.

12. An apparatus according to claim 11 wherein the ratio of length of said honeycomb element to honeycomb features is at least about 7 to 1.

13. An apparatus according to claim 11 wherein the thickness of said honeycomb element is about 1 to about 1.5 inches.

14. An apparatus according to claim 5 wherein said gas inlets are substantially perpendicular to the axis of said openings in said outlet element.

15. An apparatus according to claim 5 wherein said holding elements for said supports are adapted to hold said supports in a substantially vertical position.

16. An apparatus for storing a plurality of supports having a plurality of chemical compounds bound thereto at individual sites thereon, said apparatus comprising:
   (a) a mechanism for diffusively introducing pressurized gas into said apparatus,
   (b) an outlet element in fluid communication with said mechanism, said outlet element comprising a plurality of openings therein,
   (c) a holding chamber for said supports in fluid communication with said outlet element, said outlet element and said holding chamber being disposed such that gas flow therethrough is substantially uniform, said holding chamber comprising an opening sufficient to permit movement of said supports to and from said holding chamber and comprising a plurality of holding elements for holding said supports, and
   (d) a flow-straightening element disposed in fluid communication between said outlet element and said holding chamber.

17. An apparatus according to claim 16 wherein said mechanism comprises one or more gas inlets and a manifold comprising one or more compartments, each of said compartments being in fluid communication with one or more gas inlets.

18. An apparatus according to claim 17 wherein said gas inlets are substantially perpendicular to the axis of said openings in said outlet element.

19. An apparatus according to claim 16 wherein said holding elements for said supports are adapted to hold said supports in a substantially vertical position.

20. An apparatus for storing a plurality of supports having a plurality of biopolymers bound thereto at individual sites thereon, said apparatus comprising:
   (a) a manifold comprising one or more compartments, each of said compartments being in fluid communication with at least one gas inlet for introducing pressurized gas into said apparatus, wherein said gas inlets are positioned in said manifold such that gas is introduced into said manifold in a direction that is substantially normal to the direction of gas exiting said manifold and wherein each of said gas inlets comprises a valve,
   (b) an outlet element in fluid communication with said manifold, said outlet element comprising about 10 to about 50 openings per square inch,
   (c) a holding chamber for said supports in fluid communication with said outlet element, said outlet element and said holding chamber being disposed such that gas flow through and out of said holding chamber is substantially unidirectional and parallel to said supports, said holding chamber comprising an opening sufficient to permit movement of said supports to and from said holding chamber and comprising a plurality of holding elements for holding said supports, and
   (d) a flow-straightening element disposed in fluid communication between said outlet element and said chamber.

21. An apparatus according to claim 20 wherein said manifold is adapted for introduction of a gas at a pressure of about 60 to about 80 psi.

22. An apparatus according to claim 20 wherein said outlet element is about 0.2 to about 2 inches thick.

23. An apparatus according to claim 20 wherein the diameter of each of said openings is about 0.03 to about 0.25 inches.

24. An apparatus according to claim 20 wherein said outlet element is about 0.02 to about 0.2 inches thick and wherein said holding elements for said supports are adapted to hold said supports in a substantially vertical position.

25. An apparatus according to claim 24 wherein said flow-straightening element is a honeycomb element.

26. An apparatus according to claim 25 wherein the ratio of length of said honeycomb element to honeycomb features is at least about 7 to 1.

27. An apparatus according to claim 25 wherein the thickness of said honeycomb element is about 1 to about 1.5 inches.

28. An apparatus according to claim 20 wherein said gas inlets are substantially perpendicular to the axis of said openings in said outlet element.

29. An apparatus according to claim 20 wherein said holding elements for said supports are adapted to hold said supports in a substantially vertical position.

30. An apparatus for storing a plurality of supports having a plurality of biopolymers bound thereto at individual sites thereon, said apparatus comprising:

(a) a manifold comprising one or more compartments, each of said compartments being in fluid communication with at least one gas inlet for introducing pressurized gas into said apparatus, wherein said gas inlets are positioned in said manifold such that gas is introduced into said manifold in a direction that is substantially normal to the direction of gas exiting said manifold, (b) an outlet element in fluid communication with said manifold, said outlet element comprising a plurality of openings therein, and (c) a holding chamber for said supports in fluid communication with said outlet element, said outlet element and said holding chamber being disposed such that gas flow therethrough is substantially unidirectional, said holding chamber comprising an opening sufficient to permit movement of said supports to and from said holding chamber and comprising a plurality of holding elements for holding said supports, and (d) a flow-straightening element disposed in fluid communication between said outlet element and said chamber.

31. An apparatus according to claim 30 wherein each of said gas inlets comprises a valve.

32. An apparatus according to claim 30 wherein said outlet element is about 0.2 to about 2 inches thick and comprises about 10 to about 50 openings per square inch.

33. An apparatus according to claim 30 wherein the diameter of each of said openings is about 0.03 to about 0.25 inches.

34. An apparatus according to claim 30 wherein said outlet element is about 0.02 to about 0.2 inches thick.

35. An apparatus according to claim 30 wherein said flow-straightening element is a honeycomb element.

36. An apparatus according to claim 35 wherein the ratio of length of said honeycomb element to honeycomb features is at least about 7 to 1.

37. An apparatus according to claim 35 wherein the thickness of said honeycomb element is about 1 to about 1.5 inches.

38. An apparatus according to claim 30 wherein said gas inlets are substantially perpendicular to the axis of said openings in said outlet element.

39. An apparatus according to claim 30 wherein said holding elements for said supports are adapted to hold said supports in a substantially vertical position.

* * * * *